June 3, 1969 L. GYONGYOSI 3,447,829
DRILL ROD HANDLING TOOL
Filed Sept. 18, 1967

INVENTOR
LASZLO GYONGYOSI
BY
Frank H Thomson
ATTORNEY

United States Patent Office 3,447,829
Patented June 3, 1969

3,447,829
DRILL ROD HANDLING TOOL
Laszlo Gyongyosi, Easton, Pa., assignor to Ingersoll-Rand Company, New York, N.Y., a corporation of New Jersey
Filed Sept. 18, 1967, Ser. No. 668,463
Int. Cl. B66c 1/10
U.S. Cl. 294—99         10 Claims

ABSTRACT OF THE DISCLOSURE

A tool for handling drill rods having a reduced diameter portion near one end. The tool includes a connecting bar having a pilot member at one end which fits into the upper, open end of the drill rod. A lifting fork is at the other end of the connecting bar and fits into the reduced diameter portion of the drill rod to support the drill rod in a vertical position. A positioning member is located along the connecting bar between the lifting fork and the pilot member. Safety apparatus fits into the reduced diameter portion of the drill rod below the lifting fork when a drill rod is to be lifted.

BACKGROUND OF THE INVENTION

This invention relates to handling tools specifically design for moving a drill rod from one location to another. More particularly the invention relates to a handling tool which is used to move a drill rod to the type used with down-the-hole rock drills.

A tool similar to the present invention is shown in U.S. Patent No. 3,036,372, issued to P. P. C. Vigneron, but it cannot be used to move pipes in a vertical position which is essential for handling drill rods. If the tool of the aforementioned patent were used to move pipes in a vertical position, the pipe would fall off the tool.

During drilling operations it is necessary to add additional drill rods to the drill string as the hole being drilled becomes deeper. There are many devices for adding drill rods to a drill string. One such apparatus is the rod changer disclosed in my copending patent application, Ser. No. 635,496, filed on May 2, 1967. In that apparatus, a lazy susan rack supports a plurality of drill rods in a vertical position and is used to bring additional drill rods into position to be added to the drill string. There is an additional rack for holding a plurality of drill rods so that as drill rods are added to the drill string, the lazy susan rack may be replenished with drill rods. Since the rods are long and heavy, it is necessary to provide some apparatus for moving them.

Prior to this invention, when it was desired to move drill rods to a location where they would be stored in a vertical position, it was necessary for more than one man to handle the drill rod. This necessitated either an extra crew member on the drilling team or the use of one of the crew members for handling drill rods when he could be continuing the drilling operation. With such prior methods, if it was desired to move a rod from one location where it was in a vertical position to another place where it would be stored in a vertical position, a hoist chain or the like was wrapped around the drill rod to lift the rod. One man would hold the bottom of the rod while another man would operate the hoist. The two men would move the rod to a horizontal position and move it to the new location. The hoist would then be used to position the rod vertically.

SUMMARY

It is therefore the principal object of this invention to provide a drill rod handling tool which permits one man to move a drill rod from one location to another.

It is another object of this invention to provide a drill rod handling tool which is of simple construction and provides easy handling of drill rods.

In general, these objects are carried out by providing a tool for handling a rod having a reduced diameter portion near one end which comprises a connecting bar with means at one end of the connecting bar for holding one end of a drill rod. A lifting fork is located near the other end of the connecting bar dimensioned to receive the reduced diameter portion of the drill rod and support the drill rod in a vertical position.

BRIEF DESCRIPTION OF THE DRAWINGS

The foregoing and other objects will become apparent from the following description and drawings wherein.

DESCRIPTION OF THE PREFERRED EMBODIMENT

Figure 1:
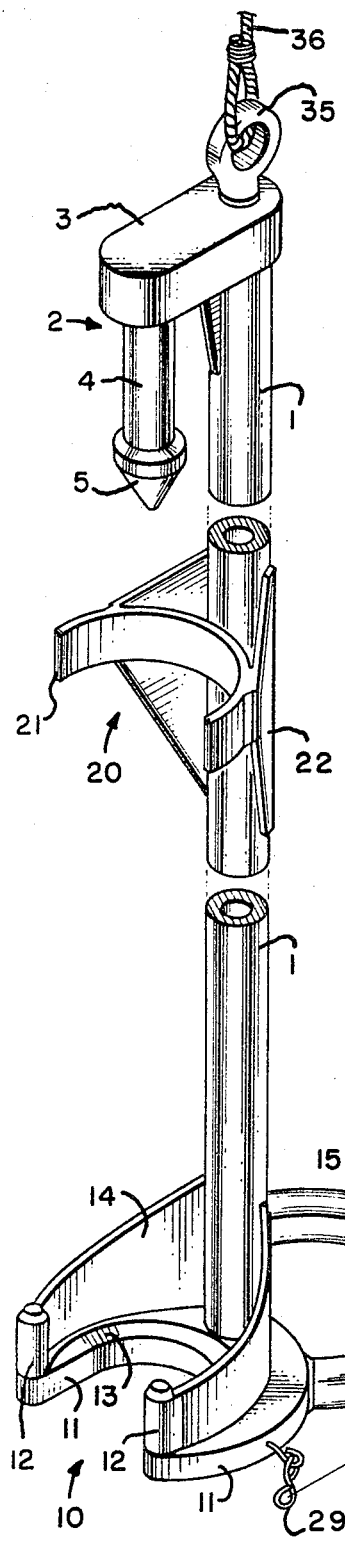
FIG. 1 is a perspective view of the tool of this invention.

The tool of this invention is used to move a drill rod 40 from one location to another. The drill rod 40 includes an upper, threaded end 41 and a reduced diameter portion 42 which defines a shoulder 43. The drill rod handling tool of this invention includes three main parts: a connecting bar 1; a pilot means 2 at the upper end of the connecting bar; and a rigid lifting fork 10 at the lower end. At least one positioner 20 is preferably located along the connecting bar 1 to help support the drill rod and keep it vertical. The pilot means 2 includes a lateral connecting piece 3 at the top of the connecting bar 1 and a pilot bar 4 having a suitable pointed end 5 extending downwardly therefrom toward the lifting fork 10. The longitudinal axis of the pilot bar 4 is parallel to the longitudinal axis of the connecting bar 1.

The upper end of the lateral connection 3 is provided with a suitable hoist guide 35 which has a hoist cable 36 connected thereto so that the tool may be raised or lowered by hoist 37.

At the lower end of the connecting bar 1, a suitable lifting fork 10 is provided and includes a pair of arms 11 extending transverse to the bar 1 and defining an arcuate, tapered shoulder 13. A finger or retainer pin 12 is mounted on the end of each arm 11. There are brace supports 14 to insure proper strength of the lifting fork 10. A handle 15 is provided on the other side of connecting bar 1 to facilitate easy handling and movement of the drill rod.

The positioner 20 includes an arcuate arm 21 and a pair of brace supports 22. Pilot bar 4, positioner 20 and lifting fork 10 are along the same axis, i.e., the centers of curvature of the positioning member 20 and lifting fork 10 are all on the same axis as the longitudinal axis of the bar 4.

Figure 3:
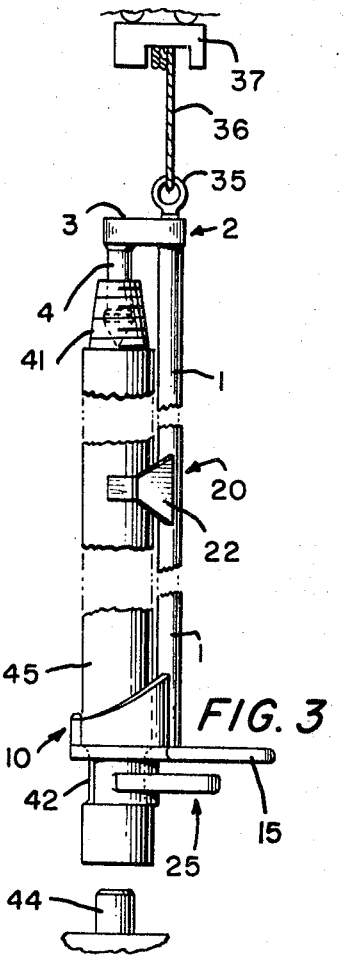
FIG. 3 is a plan view showing the tool of this invention in the position when a drill rod is being lifted.
Figure 2:
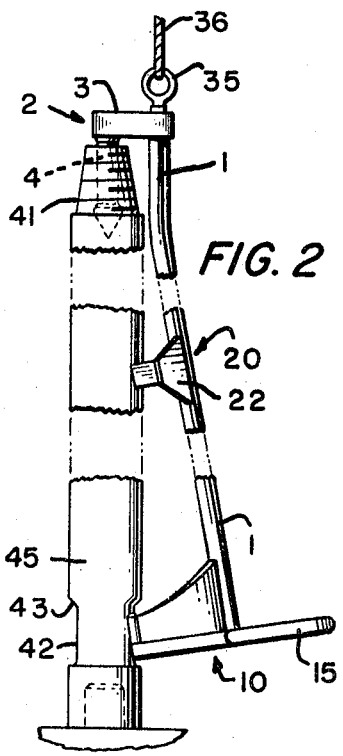
FIG. 2 is a plan view showing the rod handling tool as it is being connected to a drill rod.

When it is desired to move a drill pipe 40 from one location where it is supported in a vertical position, such as 44, to another, the hoist is lowered so that the pilot bar 4 fits into the open end 41 of the drill pipe 40 as shown in FIG. 2. The lower portion of the handling tool is bent outward relative to the pilot means 2 and lowered until the lifting fork 10 is adjacent the reduced diameter portion 42 of the drill rod. The bending of the connecting member 1 is possible because of the length of the tool. The bend is, however, exaggerated in FIG. 2 for purposes of clarity. The tool is then allowed to straighten so that the lifting fork 10 receives the reduced diameter portion 42 of the drill rod 40. The hoist motor is then operated so that the tool is moved upwardly. The shoulder 43 formed by the reduced diameter portion 42 of the drill rod fits onto the tapered shoulder 13 of the lifting fork 10. Retainer finger 12 fits along the outside of the drill rod 40 so that the lower end of the drill rod cannot move laterally outward relative to the handling tool. The upper end of the drill rod cannot move laterally because it is held in place by the positioner 20 and pilot member 2. As the hoist is moved further, the drill is picked up and supported by the lifting fork 10 as is shown in FIG. 3. The upper end of the rod is controlled by the hoist and pilot means 2 while the operator controls the lower end of the rod by means of the handle 15. When the drill rod is to be moved to its new position, the operator pulls on handle 15 and the rod follows. At the new location, the drill rod is lowered and tool removed. In the position of FIG. 3, the fingers 12 prevent the lower end of the drill rod from moving laterally with respect to the tool.

Although the tool described above is adequate, as a safety measure, I have provided suitable means to prevent the handling tool from moving downward relative to the drill pipe. In the preferred embodiment, this is simply a snap ring generally indicated at 25 which is connected to the lifting fork 10 by means of a suitable chain 29. This safety device 25 includes a suitable handle 26 and a snap ring composed of a pair of arcuate arms 27 and 28. The snap ring fits around the reduced diameter portion 42 of the drill rod 40 beneath the lifting fork 10 as shown in FIG. 3. During the movement of a drill rod, this snap ring is in place when it is desired to remove the tool from the drill rod, the snap ring is pulled out of the hoist, the handling tool is lowered and removed. When the snap ring is in place, the tool cannot be removed from the drill rod. The tool cannot move downward because the snap ring prohibits it. The tool cannot move laterally away from the drill rod 40 because the fingers 12 are designed so that the full diameter portion 45 of the drill rod 40 cannot pass between them.

Figure 4:
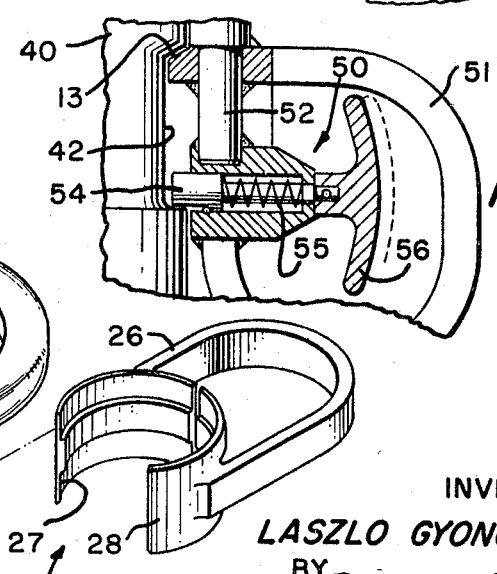
FIG. 4 is a modification of a portion of this invention.

As a modification of the safety device 25, I have provided a suitable detent means generally indicated at 50. In this embodiment there is a safety handle 51 connected to the connecting bar 1. An extension of the connecting bar indicated at 52 which together with the handle 51 holds the detent means. There is a detent pin 54 biased outwardly by a spring 55. A suitable handle 56 may be provided. This pin engages the reduced diameter portion 42 of the drill rod to prevent the handling tool from moving relative to the drill rod. When it is desired to remove the handling tool from the drill rod, the handle 56 is moved to the position shown in dotted lines in FIG. 4 which moves the detent pin 54 away from the reduced diameter portion 42.

Although but two embodiments have been shown and described, it is intended that the foregoing description not be limiting in any way and the invention be limited solely by that which is within the scope of the appended claims.

I claim:
1. A tool for handling a drill rod having a reduced diameter portion near one end comprising:
   a connecting bar;
   means at one end of said connecting bar for holding one end of a drill rod; and
   a lifting fork near the other end of said connecting bar dimensioned to receive the reduced diameter portion of the drill rod and support and drill rod in a vertical position;
   said means for holding one end of a drill rod and said lifting fork being positioned on said connecting bar and being shaped for preventing said drill rod from moving relative to said tool in any direction transverse to the longitudinal axis of said connecting bar when said tool is positioned for lifting said drill rod.
2. The handling tool of claim 1 further comprising means permitting a hoist line to be connected thereto for lifting the tool and drill rod in a vertical direction.
3. The handling tool of claim 1 wherein said lifting fork includes a pair of arms extending outwardly from said connecting bar and a finger extending upwardly from each of said arms; having a shoulder on which a drill rod is supported.
4. The handling tool of claim 3 further comprising means for preventing a drill rod from moving axially with respect to the tool.
5. The handling tool of claim 4 wherein said last mentioned means is a spring clip adapted to fit into said reduced diameter portion of the drill rod beneath said fork.
6. The handling tool of claim 4 wherein said last mentioned means includes a detent means for engaging the reduced diameter portion of the drill rod.
7. The handling tool of claim 1 wherein said holding means is a pilot member connected to the upper end of said connecting bar and extending toward said lifting fork.
8. The handling tool of claim 7 further comprising at least one positioning member mounted on said connecting bar and positioned between said pilot member and said lifting fork.
9. The handling tool of claim 8 wherein said lifting fork and said positioning member are curved and the longitudinal axis of said pilot member is coaxial with the center of curvature of said positioning member and lifting fork and is parallel to the longitudinal axis of said connecting bar.
10. The handling tool of claim 9 further comprising means permitting a hoist line to be connected thereto for lifting the tool and drill rod in a vertical direction.

References Cited

UNITED STATES PATENTS

| 1,924,424 | 8/1933 | Van Meter | 294—86.1 |
| 2,587,133 | 2/1952 | Finizie | 294—92 |
| 3,036,372 | 5/1962 | Vigneron | 29—237 |

ANDRES H. NEILSEN, *Primary Examiner.*